(12) United States Patent
Miyanabe et al.

(10) Patent No.: US 12,038,535 B2
(45) Date of Patent: Jul. 16, 2024

(54) DETECTION DEVICE, METHOD OF DETECTING DISTANCE TO OBJECT, PROGRAM, AND STORAGE MEDIUM

(71) Applicant: PIONEER CORPORATION, Tokyo (JP)

(72) Inventors: Shogo Miyanabe, Tokyo (JP); Hajime Koyanagi, Tokyo (JP)

(73) Assignee: Pioneer Corporation, Tokyo (JP)

( * ) Notice: Subject to any disclaimer, the term of this patent is extended or adjusted under 35 U.S.C. 154(b) by 1269 days.

(21) Appl. No.: 16/481,400

(22) PCT Filed: Jan. 25, 2018

(86) PCT No.: PCT/JP2018/002248
§ 371 (c)(1),
(2) Date: Jul. 26, 2019

(87) PCT Pub. No.: WO2018/139525
PCT Pub. Date: Aug. 2, 2018

(65) Prior Publication Data
US 2019/0377070 A1     Dec. 12, 2019

(30) Foreign Application Priority Data
Jan. 27, 2017 (JP) .................. 2017-012785

(51) Int. Cl.
*G01S 7/481* (2006.01)
*G01S 17/08* (2006.01)

(52) U.S. Cl.
CPC ............ *G01S 7/4816* (2013.01); *G01S 17/08* (2013.01)

(58) Field of Classification Search
None
See application file for complete search history.

(56) References Cited

U.S. PATENT DOCUMENTS

| | | |
|---|---|---|
| 8,908,159 B2 | 12/2014 | Mimeault |
| RE47,134 E | 11/2018 | Mimeault |
| (Continued) | | |

FOREIGN PATENT DOCUMENTS

| | | |
|---|---|---|
| EP | 2680030 | 1/2014 |
| JP | S47-005100 | 2/1972 |
| (Continued) | | |

OTHER PUBLICATIONS

International Search Report for related International Application No. PCT/JP2018/002248, mailed on Apr. 24, 2018; 2 pages.

(Continued)

*Primary Examiner* — Aniss Chad
*Assistant Examiner* — Mahmoud M Kazimi
(74) *Attorney, Agent, or Firm* — Procopio, Cory, Hargreaves & Savitch LLP

(57) ABSTRACT

A detection device (10) includes a transmitter (110), a receiver (120), and a control unit (140). The transmitter (110) is capable of transmitting an electromagnetic wave. The receiver (120) is capable of receiving a signal (S1), that is, the electromagnetic wave transmitted from the transmitter (110) and reflected by an object (O). The control unit (140) controls the size of an instantaneous field of view (so-called IFOV) of the receiver (120).

9 Claims, 19 Drawing Sheets

(56) References Cited

U.S. PATENT DOCUMENTS

| | | | | |
|---|---|---|---|---|
| 2008/0050013 A1* | 2/2008 | Munro | .................... | G01S 17/87 |
| | | | | 382/154 |
| 2008/0167819 A1* | 7/2008 | Breed | .................... | G08G 1/161 |
| | | | | 701/300 |
| 2012/0287417 A1* | 11/2012 | Mimeault | ............... | G01S 17/14 |
| | | | | 356/5.01 |

FOREIGN PATENT DOCUMENTS

| | | | |
|---|---|---|---|
| JP | 2007-155572 A | | 6/2007 |
| JP | 2007155572 A | * | 6/2007 |
| JP | 2011-095208 A | | 5/2011 |
| JP | 2014-029318 | | 2/2014 |
| JP | 2014-517921 | | 7/2014 |

OTHER PUBLICATIONS

Extended European Search Report for related EP App. No. 18744840.2 dated Dec. 7, 2020; 8 pages.

* cited by examiner

| EXTERNAL NOISE | INTERNAL NOISE | SIZE OF IFOV |
|---|---|---|
| A1 | B1 | X1 |
| A2 | B2 | X2 |
| . | . | . |
| . | . | . |
| . | . | . |

FIG. 17

| EXTERNAL NOISE | INTERNAL NOISE | FOCAL LENGTH |
|---|---|---|
| A1 | B1 | D1 |
| A2 | B2 | D2 |
| ⋮ | ⋮ | ⋮ |

| EXTERNAL NOISE/INTERNAL NOISE | SIZE OF IFOV |
|---|---|
| C1 | X1 |
| C2 | X2 |
| ⋮ | ⋮ |

| EXTERNAL NOISE/INTERNAL NOISE | FOCAL LENGTH |
|---|---|
| C1 | D1 |
| C2 | D2 |
| ⋮ | ⋮ |

| CURRENT POSITION OF RECEIVER | SIZE OF IFOV |
|---|---|
| P1 | X1 |
| P2 | X2 |
| . | . |
| . | . |
| . | . |

| CURRENT POSITION OF RECEIVER | FOCAL LENGTH |
|---|---|
| P1 | D1 |
| P2 | D2 |
| . | . |
| . | . |
| . | . |

NW

DETECTION DEVICE, METHOD OF DETECTING DISTANCE TO OBJECT, PROGRAM, AND STORAGE MEDIUM

CROSS-REFERENCE TO RELATED APPLICATIONS

This application is a U.S. National Stage entry of PCT Application No: PCT/JP2018/002248 filed Jan. 25, 2018, which claims priority to Japanese Patent Application No. 2017-012785, filed Jan. 27, 2017, the contents of which are incorporated herein by reference.

TECHNICAL FIELD

The present invention relates to a detection device, a method of detecting a distance to an object, a program, and a storage medium.

BACKGROUND ART

A detection device using Time Of Flight (TOF) may be used for detecting a distance to an object. Patent Document 1 discloses one example of such a detection device. The detection device includes a transmitter and a receiver. The transmitter transmits an electromagnetic wave, specifically, light. The light transmitted from the transmitter is reflected by an object. The light reflected from the object is received by the receiver. The detection device can calculate a distance to the object based on time from transmission of the light from the transmitter to receipt of the light by the receiver. In this detection device, the light transmitted from the transmitter and reflected by an object can illuminate an Instantaneous Field Of Illumination (IFOI). The receiver can receive the light entered into an Instantaneous Field Of View (IFOV).

RELATED DOCUMENT

Patent Document

[Patent Document 1] Japanese Laid-open Patent Publication No. 2011-95208

SUMMARY OF THE INVENTION

Technical Problem

Even if the transmitter and the receiver are designed such that the shape of the IFOI and the shape of the IFOV are identical to each other, and the IFOI and the IFOV overlap each other without being shifted from each other, the shape of the IFOI may practically deform from the designed shape by various factors (for example, the arrangement of an optical system). In particular, if the shape of the IFOI deforms such that a portion of the IFOI does not overlap the IFOV, an electromagnetic wave transmitted from the transmitter and reflected by the object cannot be detected at a sufficiently high level and a sufficiently high signal-to-noise ratio (SNR).

One example of an object to be solved by the present invention is to detect an electromagnetic wave transmitted from a transmitter and reflected by an object at a high level and high SNR.

Solution to Problem

The invention according to an exemplary aspect is a detection device including:
a transmitter capable of transmitting an electromagnetic wave;
a receiver capable of receiving the electromagnetic wave transmitted from the transmitter and reflected by an object; and
a control unit controlling a size of an instantaneous field of view of the receiver.

The invention according to another exemplary aspect is a method of detecting a distance to an object using a transmitter and a receiver, the method including:
a transmitter capable of transmitting an electromagnetic wave;
a receiver capable of receiving the electromagnetic wave transmitted from the transmitter and reflected by an object; and
a control unit controlling a size of an instantaneous field of view of the receiver.

The invention according to another exemplary aspect is a program causing a computer to execute the method according to the other exemplary aspect.

The invention according to another exemplary aspect is a storage medium storing the program according to the other exemplary aspect.

BRIEF DESCRIPTION OF THE DRAWINGS

The above-described object and other objects, features, and advantages will become more apparent from the preferred embodiments described below and the following drawings associated therewith.

FIGS. 2A-2D 2 are diagrams illustrating a relationship between the IFOV of a receiver and the IFOI of a signal.

FIG. 17 is a diagram illustrating a second example of the table stored in the storage unit illustrated in FIG. 14 or 15.

FIG. 18 is a diagram illustrating a third example of the table stored in the storage unit illustrated in FIG. 14 or 15.

FIG. 19 is a diagram illustrating a fourth example of the table stored in the storage unit illustrated in FIG. 14 or 15.

FIG. 22 is a diagram illustrating a first example of a table stored in a network illustrated in FIG. 20.

FIG. 23 is a diagram illustrating a second example of the table stored in the network illustrated in FIG. 20.

DESCRIPTION OF EMBODIMENTS

Hereinafter, an embodiment of the present invention will be described with reference to the drawings. In all the drawings, the same components are denoted by the same reference signs, and descriptions thereof will not be appropriately repeated.

Figure 1:
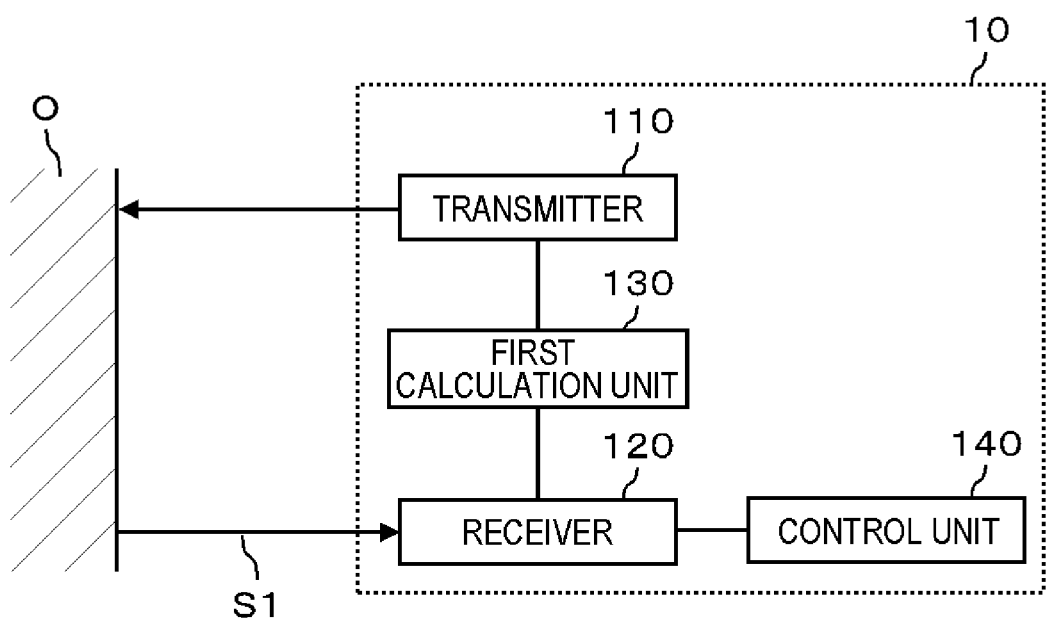
FIG. 1 is a diagram illustrating a detection device according to an embodiment.

FIG. 1 is a diagram illustrating a detection device 10 according to an embodiment.

The outline of the detection device 10 will be described with reference to FIG. 1. The detection device 10 includes a transmitter 110, a receiver 120, and a control unit 140. The transmitter 110 is capable of transmitting an electromagnetic wave. The receiver 120 is capable of receiving a signal S1, that is, the electromagnetic wave transmitted from the transmitter 110 and reflected by an object O. The control unit 140 controls the size of an Instantaneous Field Of View (so-called IFOV) of the receiver 120.

According to the above configuration, the signal S1, that is, the electromagnetic wave transmitted from the transmitter 110 and reflected by the object O can be detected at a high level and a high signal-to-noise ratio (SNR). Specifically, as will be described later with reference to FIG. 2, the control unit 140 can control the size of the IFOV of the receiver 120 in response to the shape of an Instantaneous Field Of Illumination (IFOI) of the electromagnetic wave of the signal S1 and the level of noise entering into the IFOV of the receiver 120 from an outside of the receiver 120. The signal S1 can be detected at a high level by controlling the size of the IFOV of the receiver 120 in response to the shape of the IFOI of the signal S1. The signal S1 can be detected at high SNR also by controlling the size of the IFOV of the receiver 120 in response to the level of the noise entering into the IFOV of the receiver 120 from the outside of the receiver 120.

Next, details of the detection device 10 will be described with reference to FIG. 1. The detection device 10 includes the transmitter 110, the receiver 120, a first calculation unit 130, and a control unit 140.

The transmitter 110 is capable of transmitting an electromagnetic wave. In one example, the transmitter 110 is capable of transmitting light (for example, UV light, visible light, or infrared light). In another example, the transmitter 110 is capable of transmitting a radio wave. When the transmitter 110 is capable of transmitting light, the detection device 10 can function as LIght Detection And Ranging (LIDAR). When the transmitter 110 is capable of transmitting light, the transmitter 110 may be a laser diode (LD), for example. When the transmitter 110 is capable of transmitting a radio wave, the transmitter 110 can function as RAdio Detection And Ranging (RADAR).

An electromagnetic wave transmitted from the transmitter 110 is reflected by the object O. The electromagnetic wave reflected from the object O is received by the receiver 120.

In one example, the receiver 120 includes an avalanche diode (AD). In particular, when the receiver 120 receives light, the receiver 120 may include an avalanche photo diode (APD). In this example, the receiver 120 can cause the APD to receive the electromagnetic wave reflected from the object O.

The first calculation unit 130 can measure a distance to the object O based on Time Of Flight (TOF). Specifically, the first calculation unit 130 can calculate the distance from the detection device 10 to the object O based on time from transmission of the electromagnetic wave from the transmitter 110 to receipt of the electromagnetic wave by the receiver 120.

The control unit 140 controls the receiver 120, and specifically controls the size of the IFOV of the receiver 120. The control unit 140 may be a circuit, for example. A computer may cause the control unit 140 to control the size of the IFOV of the receiver 120. In one example, a program can cause the computer to perform the above-described method. The program may be stored in a storage medium.

FIG. 2 is a diagram illustrating a relationship between the IFOV of the receiver 120 and the IFOI of the signal S1. In FIG. 2A the shape of the IFOI is an ideal shape, whereas in FIGS. 2B to 2D the shape of the IFOI is a practical shape. The shape illustrated in FIG. 2A is ideal for the shape of the IFOI. However, in practice, the shape of the IFOI may deform from the ideal shape in FIG. 2A by various factors (for example, the arrangement of an optical system), as illustrated in FIGS. 2B to 2D.

Figure 2A:
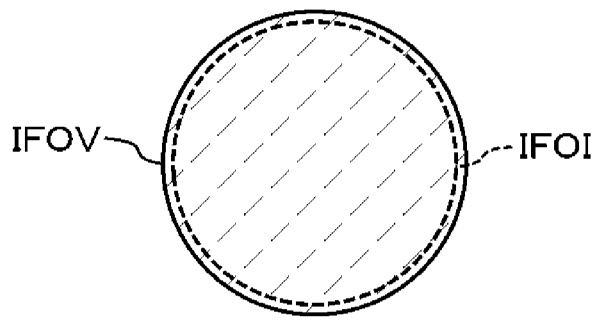

FIG. 2A illustrates an example in which the shape of the IFOI is almost the same as the shape of the IFOV and is a circle, and the entirety of the IFOI overlaps the IFOV. In FIG. 2A, when the receiver 120 receives the signal S1, the entirety of the signal S1 is detected, and noise entering into the IFOV of the receiver 120 from the outside of the receiver 120 is suppressed to be small, and the signal S1 can be detected at a high level and high SNR.

Figure 2B:
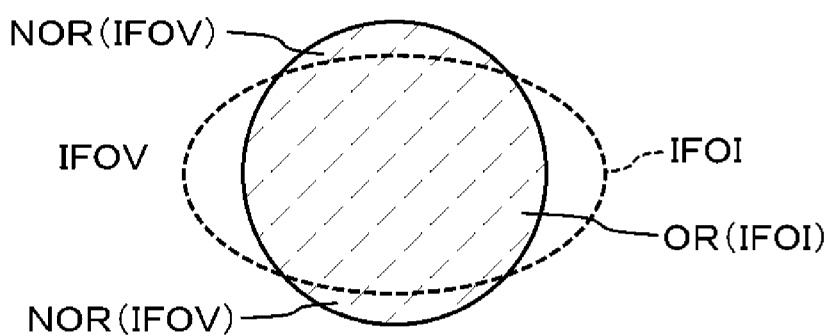

FIG. 2B illustrates an example similar to the example illustrated in FIG. 2A except that the shape of the IFOI deforms to be an ellipse, and a portion of the IFOI is located on an outside of the IFOV and does not overlap the IFOV. The IFOI has a region (overlapping region OR) overlapping the IFOV, and the IFOV has a region (non-overlapping region NOR) not overlapping the IFOI. In FIG. 2B, even if the signal S1 is received by the receiver 120, only a portion of the signal S1 (that is, a portion corresponding to the overlapping region OR) is detected. Thus, it is not possible to detect the signal S1 at a sufficiently high level and sufficiently high SNR.

Figure 2C:
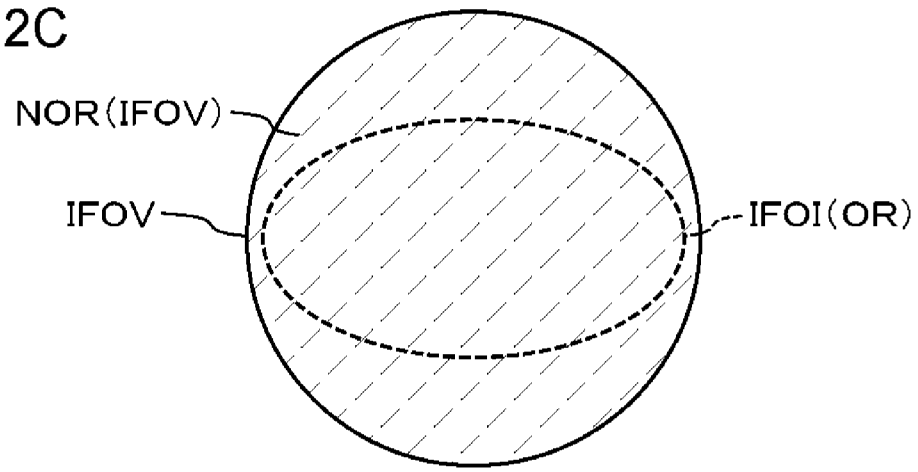

FIG. 2C illustrates an example similar to the example illustrated in FIG. 2B except that the size of the IFOV is large, and the IFOV overlaps the entirety of the IFOI. In FIG. 2C, when the receiver 120 receives the signal S1, the entirety of the signal S1 is detected and the signal S1 can be detected at the maximum level. In FIG. 2C, however, when the level of noise per unit area that enters into the IFOV is high, the signal S1 cannot be detected at sufficiently high SNR, because of the large non-overlapping region NOR of the IFOV. Thus, the condition illustrated in FIG. 2C can be a condition allowing the receiver 120 to desirably operate when the level of the noise per unit area that enters into the IFOV is low to some extent.

Figure 2D:
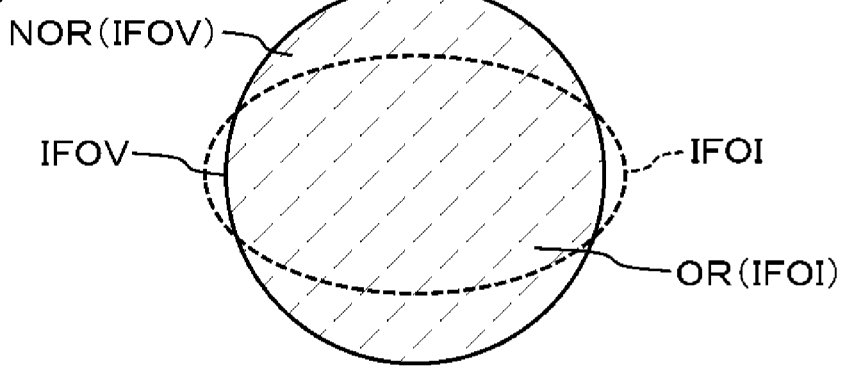

FIG. 2D illustrates an example similar to the example illustrated in FIG. 2C except that the size of the IFOV is larger than the size of the IFOV in FIG. 2B and smaller than the size of the IFOV in FIG. 2C, and a portion of the IFOI is located outside the IFOV and does not overlap the IFOV. In FIG. 2D, when the receiver 120 receives the signal S1, a large portion of the signal S1 is detected and the signal S1 can be detected at a sufficiently high level. Also in FIG. 2D, even when the level of the noise per unit area that enters into the IFOV is high, the signal S1 can be detected at sufficiently high SNR, because of the small non-overlapping region NOR of the IFOV. However, when the level of the noise per unit area that enters into the IFOV is low to some extent, even if the receiver 120 is operated in the condition illustrated in FIG. 2C, the signal S1 can be detected at sufficiently high SNR and the signal S1 can be detected at a level higher than the level in the example illustrated in FIG. 2D. Thus, the condition illustrated in FIG. 2D can be a condition allowing the receiver 120 to desirably operate when the level of the noise per unit area that enters into the IFOV is high to some extent.

Figure 3:
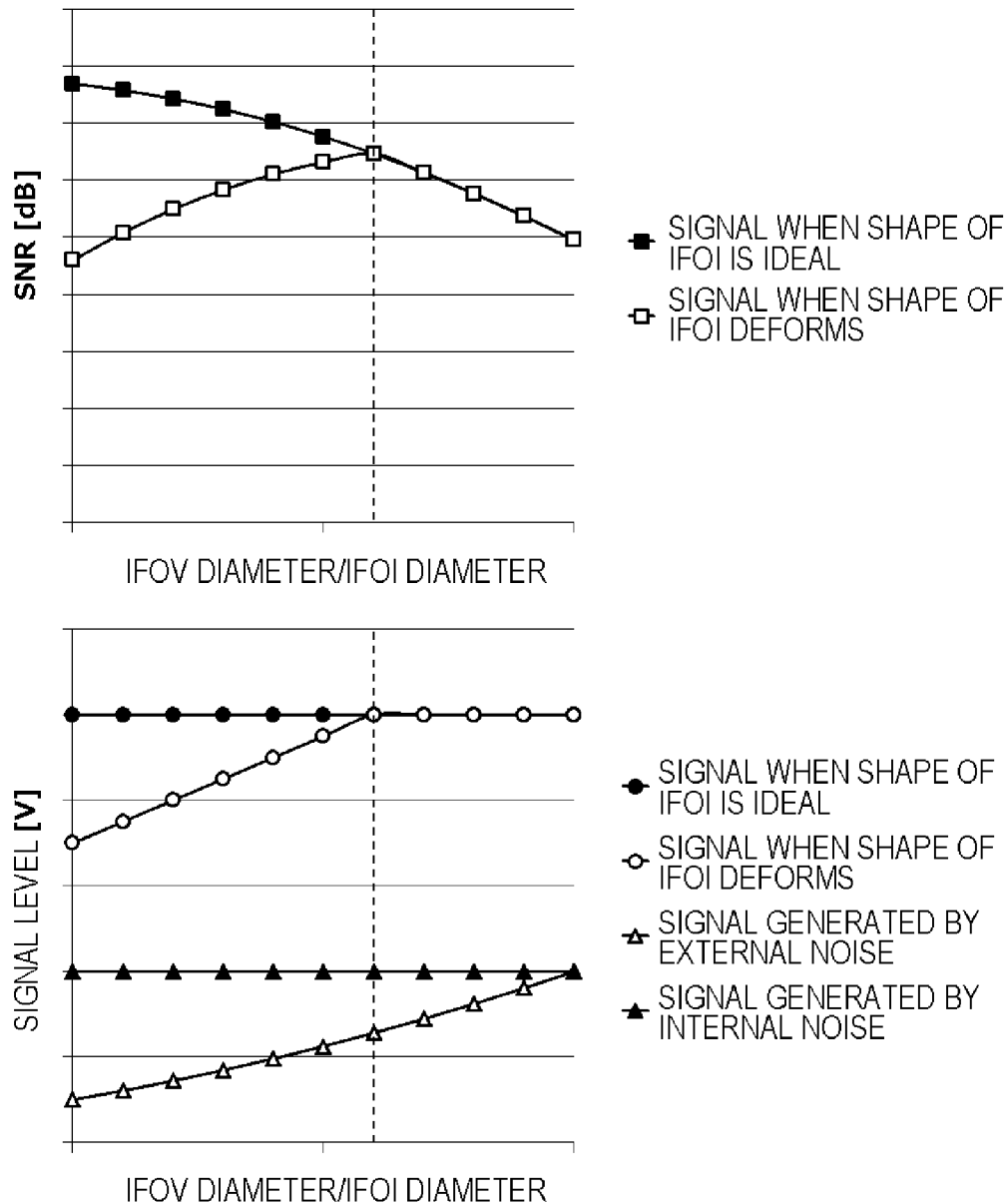
FIG. 3 is a graph illustrating a first example of a method of controlling a size of the IFOV of the receiver by a control unit.

FIG. 3 is a graph illustrating a first example of a method of controlling the size of the IFOV of the receiver 120 by the control unit 140.

A graph on the upper side in FIG. 3 represents the SNR of a signal generated from the receiver 120 by the signal S1 when the shape of the IFOI is an ideal shape as illustrated in FIG. 2A and the SNR of a signal generated from the receiver 120 by the signal S1 when the shape of the IFOI deforms as illustrated in FIGS. 2B to 2D.

A graph on the lower side in FIG. 3 represents a level of the signal generated from the receiver 120 by the signal S1 when the shape of the IFOI is an ideal shape as illustrated in FIG. 2A, a level of the signal generated from the receiver 120 by the signal S1 when the shape of the IFOI deforms as illustrated in FIGS. 2B to 2D, a level of a signal generated from the receiver 120 by external noise (noise entering into the IFOV of the receiver 120 from the outside of the receiver 120), and a level of a signal generated from the receiver 120 by internal noise (noise generated by a factor different from an electromagnetic wave: for example, noise generated from a circuit constituting the receiver 120).

In the example illustrated in FIG. 3, the level of the noise per unit area that enters into the IFOV of the receiver 120 is low. Specifically, as represented by the graph on the lower side in FIG. 3, the level of the signal generated by the external noise is lower than the level of the signal generated by the internal noise.

When the shape of the IFOI is an ideal shape as illustrated in FIG. 2A, the SNR of the signal generated by the signal S1 is reduced with increasing the size of the IFOV, as represented by the graph on the upper side in FIG. 3. This is because the level of the external noise increases by increasing the size of the IFOV.

When the shape of the IFOI deforms as illustrated in FIGS. 2B to 2D, if the size of the IFOV increases, the level of the signal generated by the signal S1 increases as represented by the graph on the lower side in FIG. 3, and the SNR of the signal generated by the signal S1 increases as represented by the graph on the upper side in FIG. 3. In particular, in the example illustrated in FIG. 3, the level of the signal generated by the signal S1 reaches the maximum at the size of the IFOV at which the SNR of the signal generated by the signal S1 is the maximum. That is, when the level of the noise per unit area that enters into the IFOV of the receiver 120 is low to some extent, the control unit 140 can control the size of the IFOV such that both the SNR of the signal generated by the signal S1 and the level of the signal generated by the signal S1 is the maximum.

Figure 4:
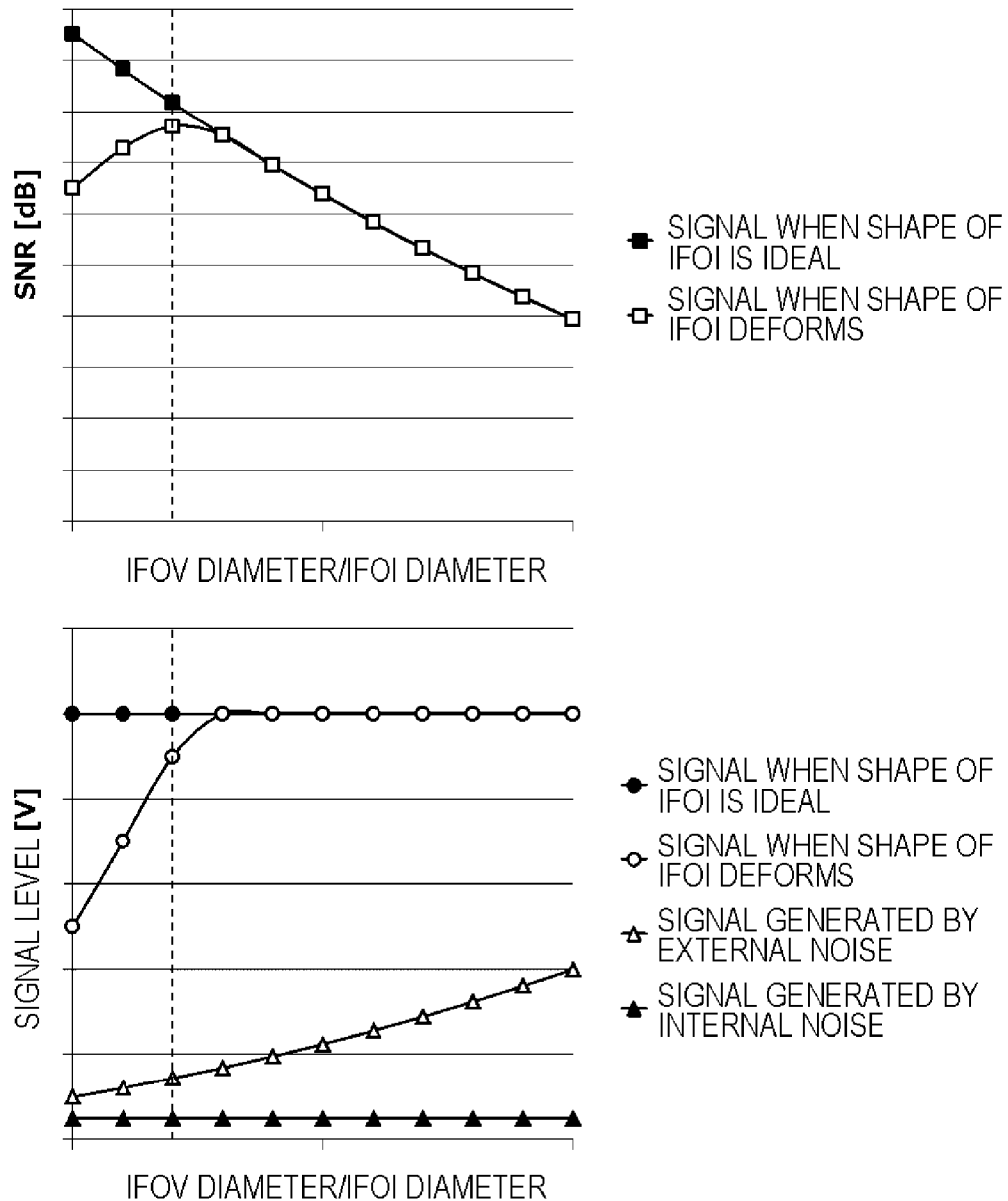
FIG. 4 is a graph illustrating a second example of the method of controlling the size of the IFOV of the receiver by the control unit.

FIG. 4 is a graph illustrating a second example of the method of controlling the size of the IFOV of the receiver 120 by the control unit 140. The example illustrated in FIG. 4 is similar to the example illustrated in FIG. 3 except for the following points.

In the example illustrated in FIG. 4, the level of the noise per unit area that enters into the IFOV of the receiver 120 is high. Specifically, as represented by the graph on the lower side in FIG. 4, the level of the signal generated by the external noise is lower than the level of the signal generated by the internal noise.

When the shape of the IFOI is an ideal shape as illustrated in FIG. 2A, the SNR of the signal generated by the signal S1 is reduced with increasing the size of the IFOV, as represented by the graph on the upper side in FIG. 4. This is because the level of the external noise increases by increasing the size of the IFOV.

When the shape of the IFOI deforms as illustrated in FIGS. 2B to 2D, if the size of the IFOV increases, the level of the signal generated by the signal S1 increases as represented by the graph on the lower side in FIG. 4, and the SNR of the signal generated by the signal S1 increases as represented by the graph on the upper side in FIG. 4. In particular, in the example illustrated in FIG. 4, the level of the signal generated by the signal S1 does not reach the maximum at the size of the IFOV at which the SNR of the signal generated by the signal S1 is the maximum. The SNR of the signal generated by the signal S1 is less than the maximum value at the size of the IFOV at which the level of the signal generated by the signal S1 is the maximum. That is, when the level of the noise per unit area that enters into the IFOV of the receiver 120 is high to some extent, the control unit 140 can control the size of the IFOV such that both the SNR of the signal generated by the signal S1 and the level of the signal generated by the signal S1 is as high as possible, in particular, in the example illustrated in FIG. 4, for example, such that the SNR of the signal generated by the signal S1 is the maximum.

As is clear from FIGS. 2, 3 and 4, the control unit 140 can control the size of the IFOV of the receiver 120 in response to the shape of the IFOI of the signal S1. The signal S1 can be detected at a high level by controlling the size of the IFOV of the receiver 120 in response to the shape of the IFOI of the signal S1. In particular, when the entirety of the IFOI of the signal S1 overlaps the IFOV of the receiver 120, the level of the signal generated from the receiver 120 by the signal S1 is the maximum.

Also, the control unit 140 can control the size of the IFOV of the receiver 120 in response to the level of the noise entering into the IFOV of the receiver 120 from the outside of the receiver 120. The signal S1 can be detected at high SNR by controlling the size of the IFOV of the receiver 120 in response to the level of the noise entering into the IFOV of the receiver 120 from the outside of the receiver 120.

Figure 5:
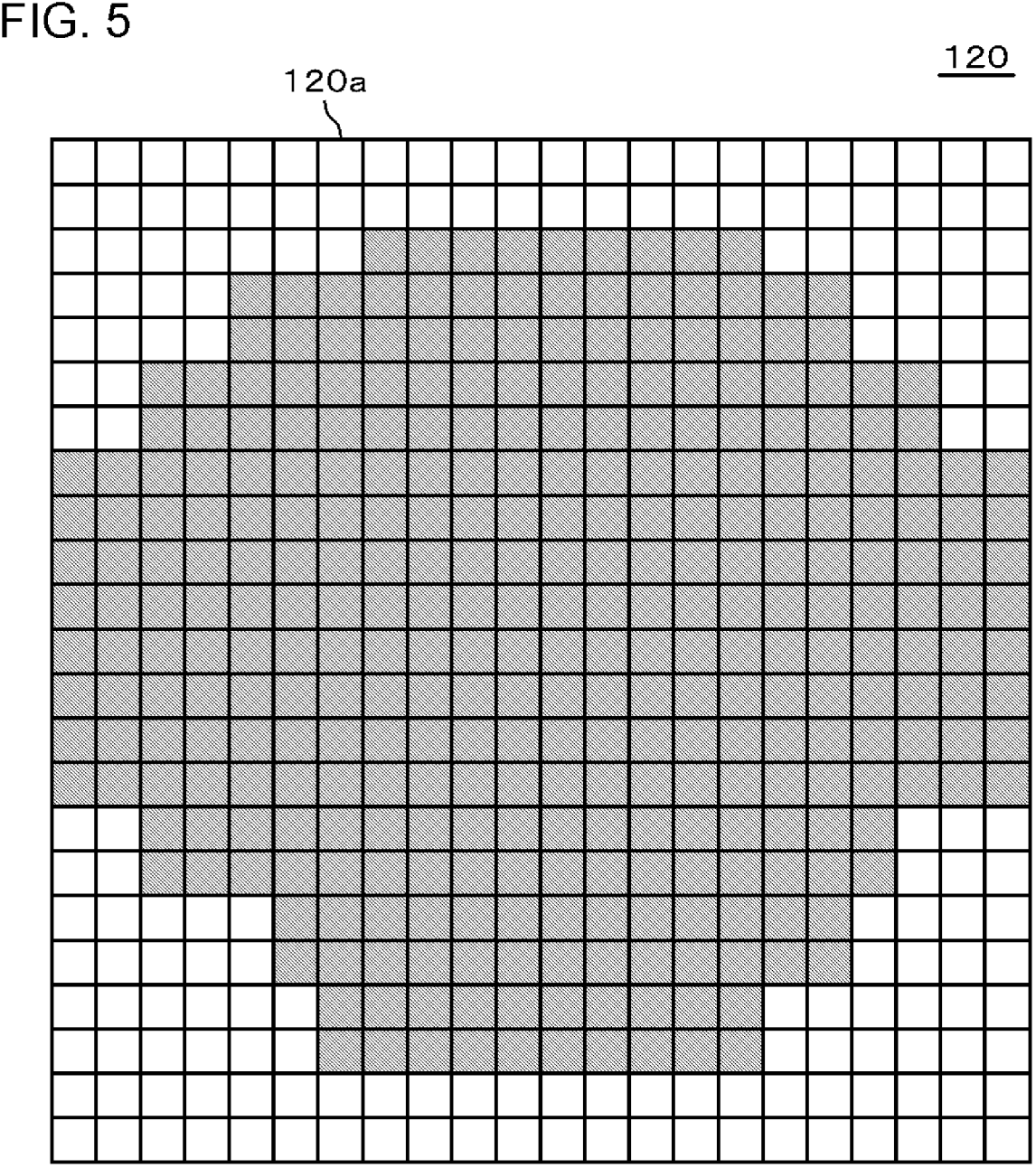
FIG. 5 is a diagram illustrating one example of details of the receiver.

FIG. 5 is a diagram illustrating one example of details of the receiver 120.

The receiver 120 includes a plurality of receiving elements 120a. The plurality of receiving elements 120a is arranged in a two-dimensional array. In one example, each receiving element 120a may be an avalanche diode (AD). In particular, when the receiving element 120a receives light, each receiving element 120a may be an avalanche photo diode (APD). In another example, each receiving element 120a may be a photodiode (PD). In this example, the plurality of receiving elements 120a may constitute an imaging element such as a Charge-Coupled Device (CCD)

image sensor or a Complementary Metal-Oxide-Semiconductor (CMOS) image sensor, for example.

In the example illustrated in FIG. 5, the hatched portion represents the receiving element 120a receiving an electromagnetic wave, and the unhatched portion represents the receiving element 120a not receiving the electromagnetic wave. Thus, the control unit 140 (FIG. 1) can determine the shape of the IFOI (for example, FIG. 2) of the signal S1 (FIG. 1) based on the receipt result of each of the plurality of receiving elements 120a (the presence or absence of the receipt of the electromagnetic wave).

Figure 6:
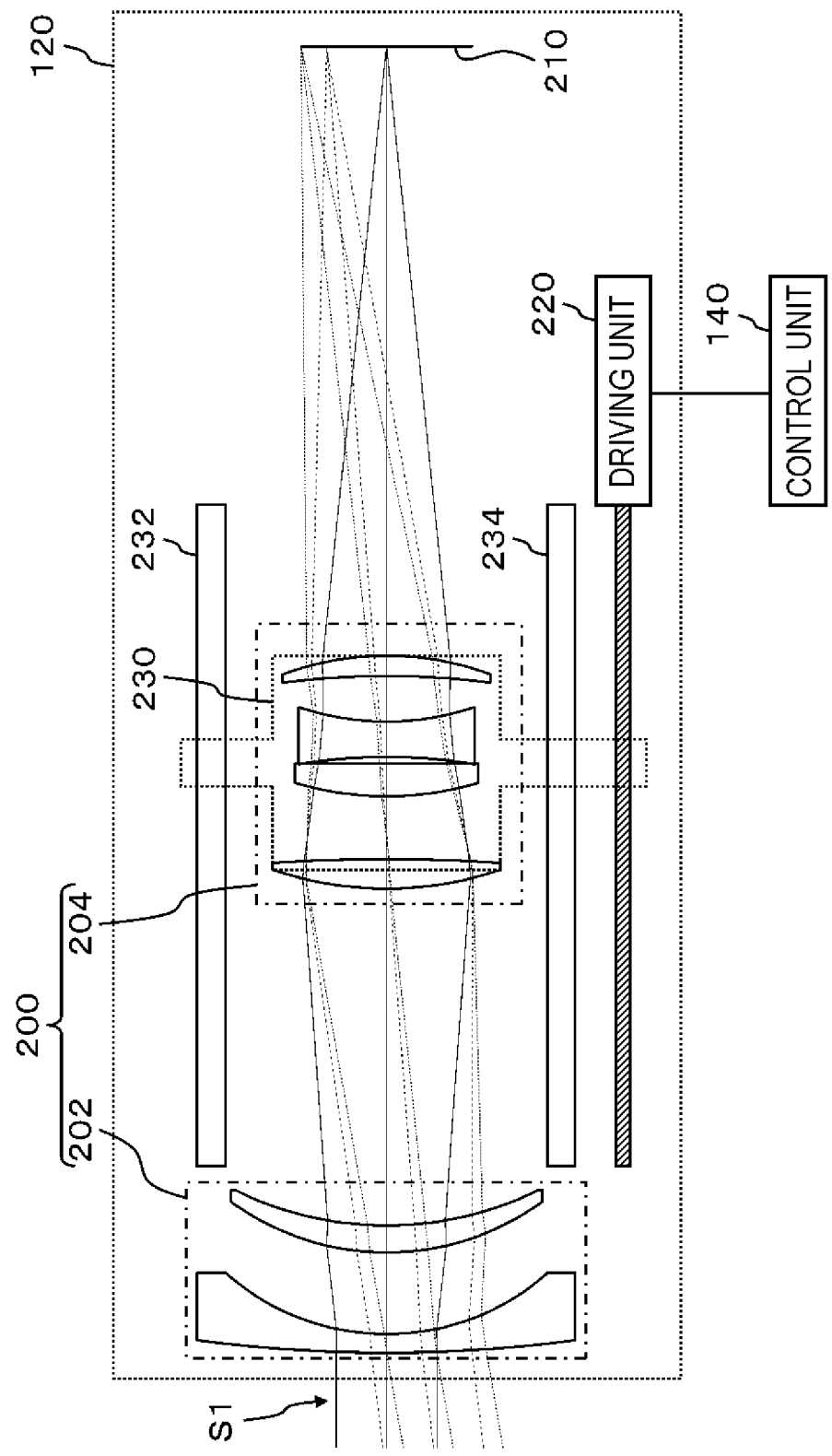
FIG. 6 is a diagram for explaining one example of the details of the receiver.
Figure 7:
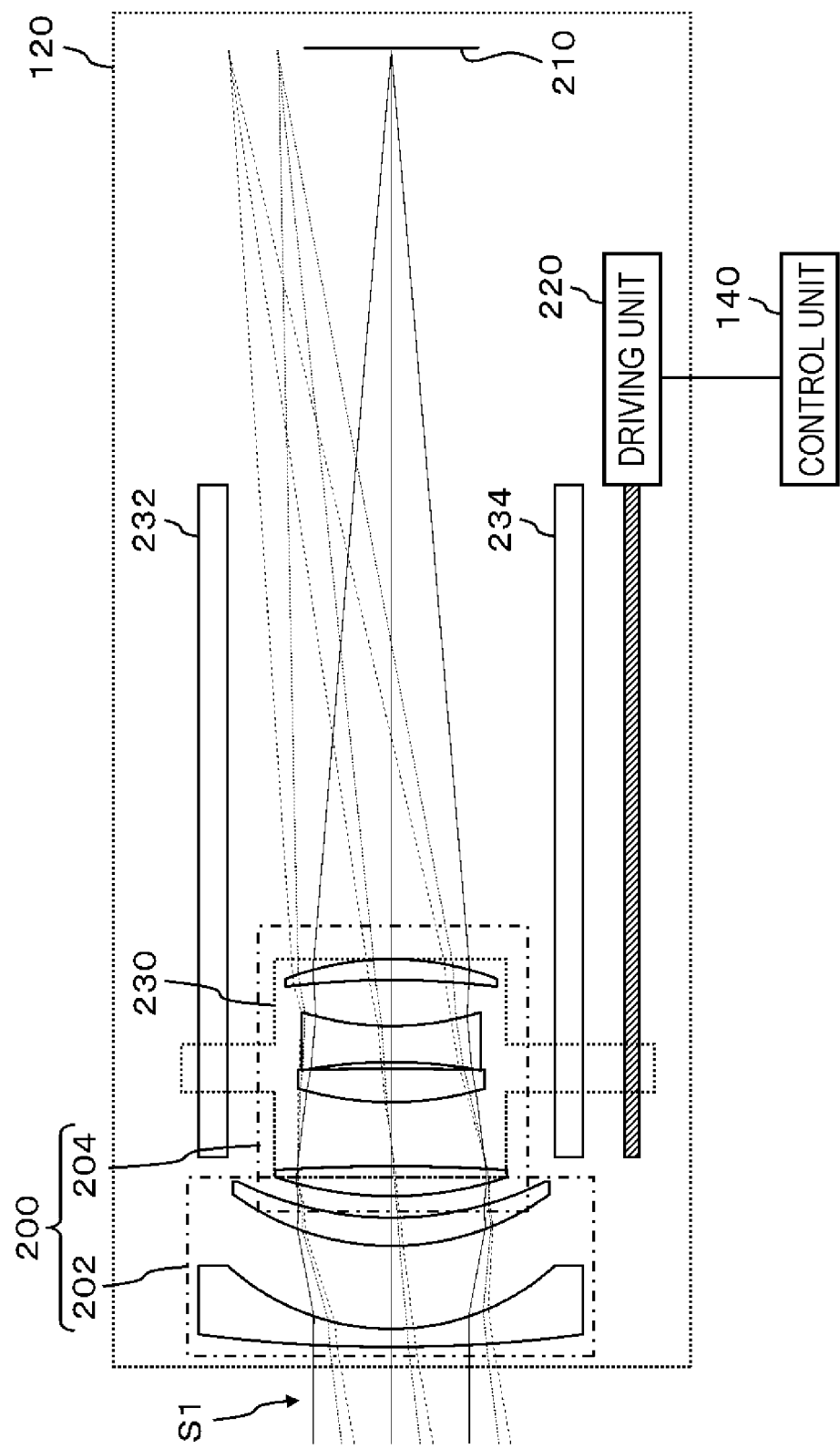
FIG. 7 is a diagram for explaining one example of the details of the receiver.

Each of FIGS. 6 and 7 is a diagram for explaining one example of the details of the receiver 120.

The receiver 120 includes an optical system 200, a light receiving element 210, a driving unit 220, a holder 230, a shaft 232, and a shaft 234.

The optical system 200 converges the signal S1 at a position spaced by a focal length. The optical system 200 includes a first lens group 202 and a second lens group 204 and functions as a zoom lens. Specifically, the first lens group 202 is fixed, but the second lens group 204 is movable. When the second lens group 204 is moved, the focal length changes while keeping the position of a focal point relative to the first lens group 202 constant.

The light receiving element 210 receives an electromagnetic wave converged by the optical system 200. The light receiving element 210 overlaps the focal point of the optical system 200. In one example, the light receiving element 210 is an avalanche diode (AD). In particular, when the light receiving element 210 receives light, the light receiving element 210 may be an avalanche photo diode (APD).

The driving unit 220 moves the second lens group 204 of the optical system 200 by using the holder 230, the shaft 232, and the shaft 234. Specifically, the holder 230 holds the second lens group 204 of the optical system 200 and is movably attached to the shaft 232 and the shaft 234. The driving unit 220 moves the holder 230 along the shaft 232 and the shaft 234 to move the second lens group 204 of the optical system 200 along the shaft 232 and the shaft 234.

The control unit 140 controls the driving unit 220, in particular, controls the focal length of the optical system 200. The size of the IFOV of the receiver 120 can be controlled by controlling the focal length of the optical system 200. Specifically, the size of the IFOV of the receiver 120 changes depending on the focal length of the optical system 200. In particular, the size of the IFOV of the receiver 120 increases as the focal length of the optical system 200 becomes shorter. In the example illustrated in FIG. 6, the focal length of the optical system 200 is short, and the size of the IFOV of the receiver 120 can be large. On the contrary, in the example illustrated in FIG. 7, the focal length of the optical system 200 is long, and the size of the IFOV of the receiver 120 can be small.

Figure 8:
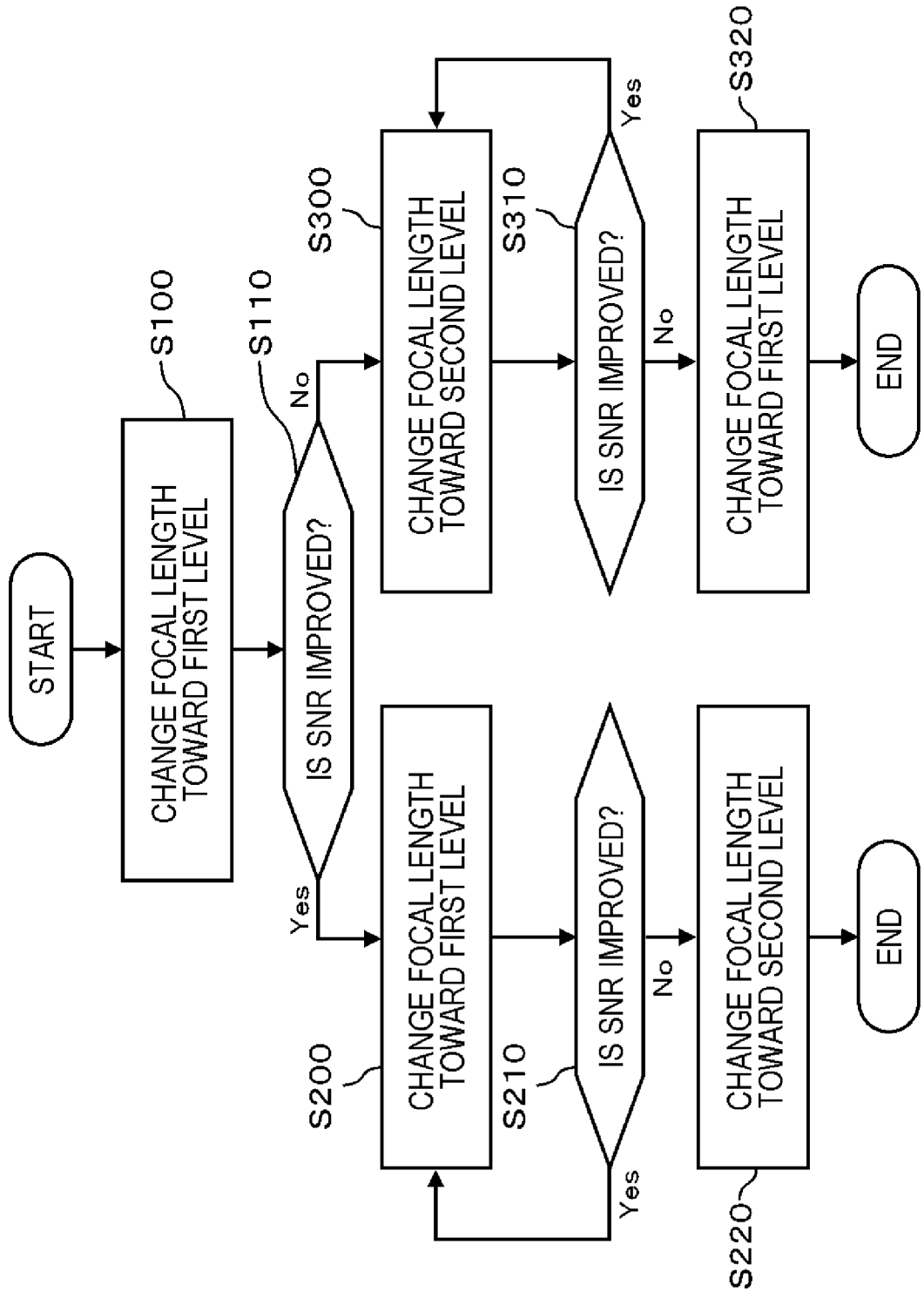
FIG. 8 is a flowchart for explaining one example of an operation of the control unit in FIGS. 6 and 7.

FIG. 8 is a flowchart for explaining one example of an operation of the control unit 140 in FIGS. 6 and 7.

In the example illustrated in FIG. 8, the control unit 140 can determine the optimum focal length of the optical system 200 in a manner as follows.

First, the control unit 140 changes the focal length toward one of a side to increase the focal length and a side to decrease the focal length (Step S100). That is, the control unit 140 moves the second lens group 204 such that the second lens group 204 approaches to the first lens group 202 or departs from the first lens group 202. Here, descriptions will be made on the assumption that the side at which the control unit 140 changes the focal length in Step S100 is defined as "a first level".

Then, the control unit 140 determines whether or not the SNR of the signal S1 after the change of the focal length is improved (Step S110).

When the SNR of the signal S1 after the change of the focal length is improved in Step S110, the control unit 140 changes the focal length of the optical system 200 toward the first level (Step S200). Then, the control unit 140 determines whether or not the SNR of the signal S1 after the change of the focal length is improved (Step S210). The control unit 140 repeats Step S200 and Step S210 so long as the SNR of the signal S1 is improved. On the contrary, when the SNR of the signal S1 after the change of the focal length is deteriorated, the control unit 140 changes the focal length toward a second level opposite to the first level (when the first level is the side to increase the focal length, the second level is the side to decrease the focal length, and when the first level is the side to decrease the focal length, the second level is the side to increase the focal length) (Step S220).

In one example, a changed distance of the focal length in Step S220 may be substantially equal to a changed distance of the focal length in Step S200 just before Step S220. When the SNR of the signal S1 is deteriorated in Step S210, there is a high possibility that the focal length just before this step is the optimum focal length. In the above-described example, the focal length can be the optimum focal length as described above.

When the SNR of the signal S1 is constant without improvement or deterioration in Step S210, the control unit 140 changes the focal length neither toward the first level nor toward the second level and may determine the focal length at this time point to be the optimum focal length.

When the SNR of the signal S1 after the change of the focal length is deteriorated in Step S110, the control unit 140 changes the focal length of the optical system 200 toward the second level (Step S300). Then, the control unit 140 determines whether or not the SNR of the signal S1 after the change of the focal length is improved (Step S310). The control unit 140 repeats Step S300 and Step S310 so long as the SNR of the signal S1 is improved. On the contrary, when the SNR of the signal S1 after the change of the focal length is deteriorated, the control unit 140 changes the focal length toward the first level (Step S320).

In one example, a changed distance of the focal length in Step S320 may be substantially equal to a changed distance of the focal length in Step S300 just before Step S320. When the SNR of the signal S1 is deteriorated in Step S310, there is a high possibility that the focal length just before this step is the optimum focal length. In the above-described example, the focal length can be the optimum focal length as described above.

When the SNR of the signal S1 is constant without improvement or deterioration in Step S310, the control unit 140 changes the focal length neither toward the first level nor toward the second level and may determine the focal length at this time point to be the optimum focal length.

As mentioned above, according to the embodiment, the electromagnetic wave transmitted from the transmitter 110 and reflected by the object O can be detected at a high level and high SNR.

EXAMPLES

Example 1

Figure 9:
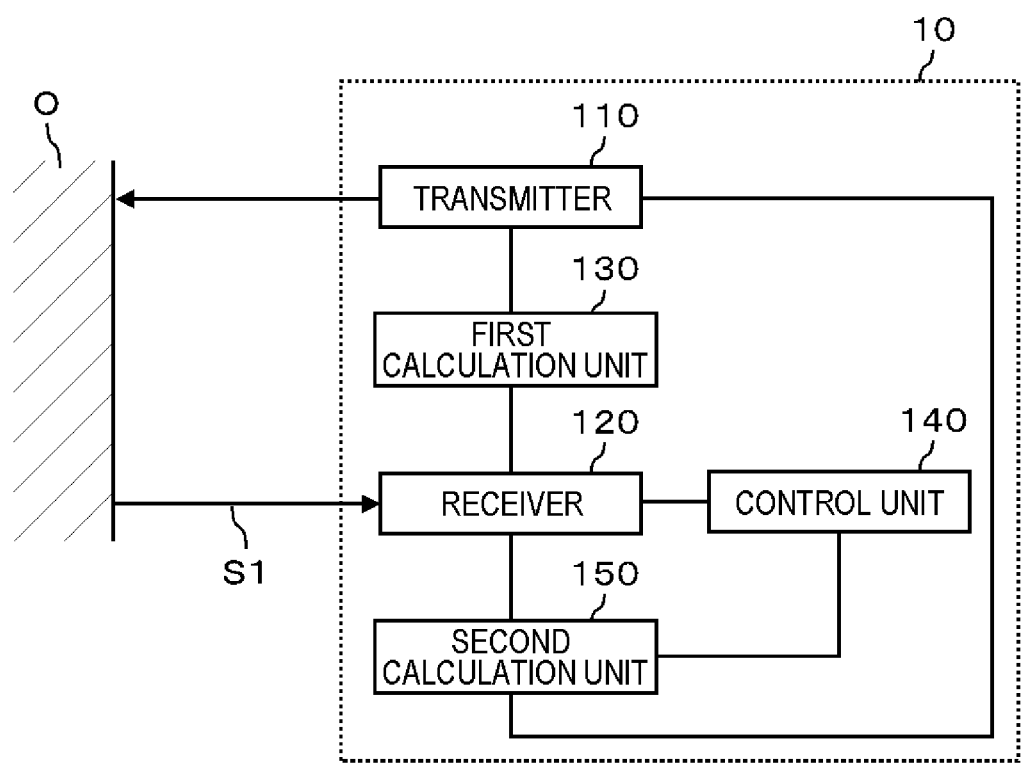
FIG. 9 is a diagram illustrating a detection device according to Example 1.

FIG. 9 is a diagram illustrating a detection device 10 according to Example 1 and corresponds to FIG. 1 in the embodiment. The detection device 10 according to the example is similar to the detection device 10 according to the embodiment except for the following points.

The detection device 10 includes a second calculation unit 150. The control unit 140 can determine the level of external noise (noise entering into the IFOV of the receiver 120 from the outside of the receiver 120) based on the calculation result of the second calculation unit 150.

In the example illustrated in FIG. 9, the second calculation unit 150 calculates the level of the external noise (noise entering into the IFOV of the receiver 120 from the outside of the receiver 120) based on the receipt result of the receiver 120, in particular, calculates the level of the external noise based on a timing at which the electromagnetic wave is transmitted from the transmitter 110. When the distance from the detection device 10 to the object O is determined within a predetermined range of some extent in advance, the time from transmission of the electromagnetic wave from the transmitter 110 to receipt of the electromagnetic wave by the receiver 120 is also determined in a range of some extent. Thus, by calculating the level of a signal generated from the receiver 120 based on a transmission timing of the electromagnetic wave by the transmitter 110, the second calculation unit 150 can calculate the level of a signal generated at a timing at which the receiver 120 does not receive the signal S1 (that is, the noise generated from receiver 120 by the external noise). The level of the signal can be determined, for example, by root mean square (RMS) of this signal.

Figure 10:
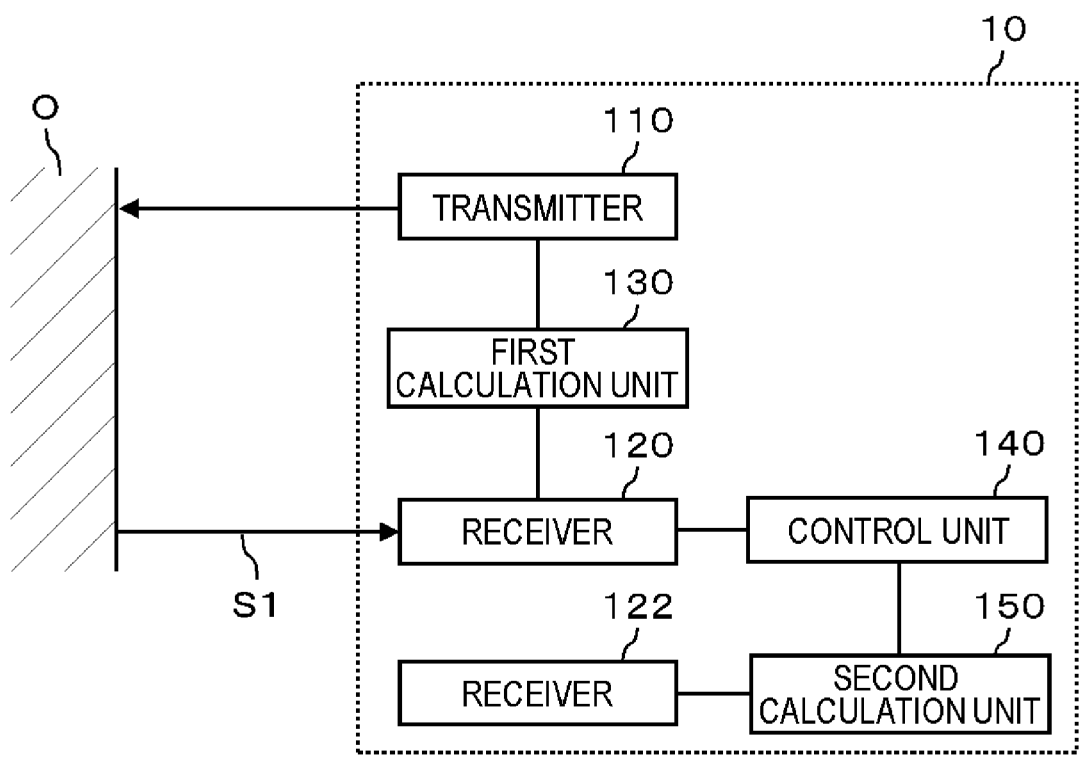
FIG. 10 is a diagram illustrating a modification example of FIG. 9.

FIG. 10 is a diagram illustrating a modification example of FIG. 9. The control unit 140 may determine the level of the external noise in a manner as follows.

The detection device 10 includes a receiver 122. The second calculation unit 150 calculates the level of the external noise based on the receipt result of the receiver 122. Specifically, the receiver 122 is disposed at a position at which the signal S1 is not input to the receiver 122. Therefore, the receiver 122 receives only noise that may enter into the IFOV of the receiver 120. Thus, the control unit 140 can determine the level of the external noise based on the calculation result of the second calculation unit 150.

Example 2

Figure 11:
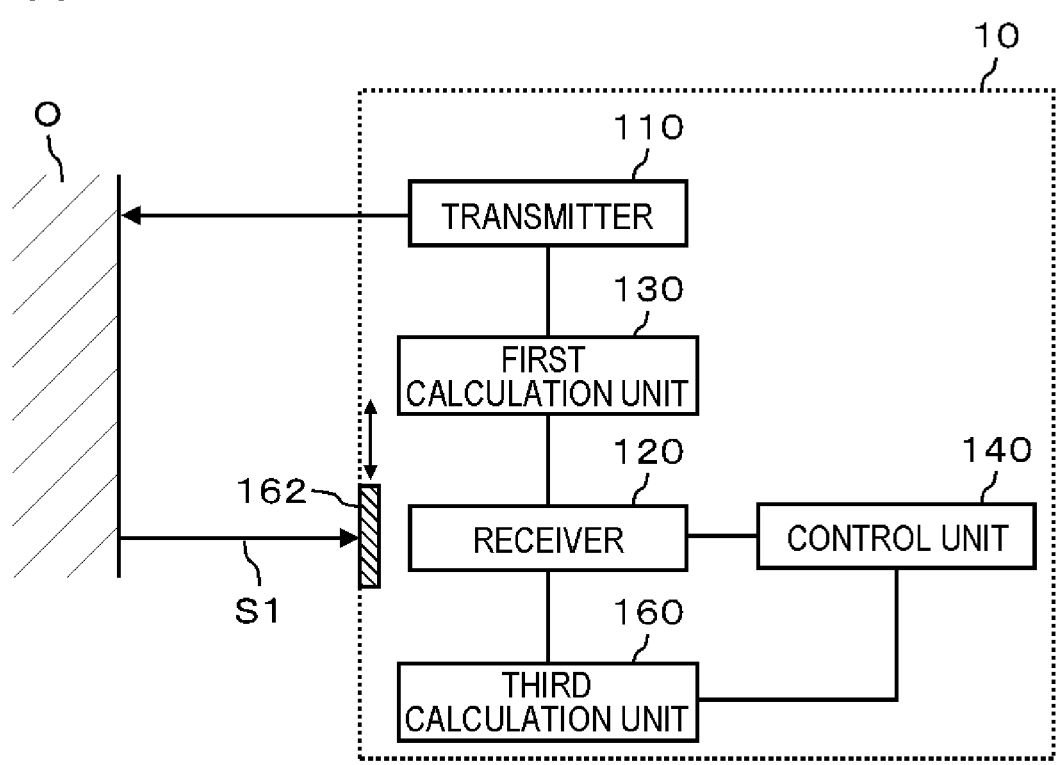
FIG. 11 is a diagram illustrating a detection device according to Example 2.

FIG. 11 is a diagram illustrating a detection device 10 according to Example 2 and corresponds to FIG. 1 in the embodiment. The detection device 10 according to the example is similar to the detection device 10 according to the embodiment except for the following points.

The detection device 10 includes a third calculation unit 160. The control unit 140 can determine the level of the internal noise (noise generated by a factor different from an electromagnetic wave: for example, noise generated from a circuit constituting the receiver 120) based on the calculation result of the third calculation unit 160.

In the example illustrated in FIG. 11, the detection device 10 includes a shutter 162. The shutter 162 is openable and closable. When the shutter 162 is opened, the receiver 120 can receive an electromagnetic wave from the outside of the detection device 10. When the shutter 162 is closed, the receiver 120 is shielded from the electromagnetic wave from the outside of the detection device 10. The third calculation unit 160 can calculate the level of a signal generated from the receiver 120 by the internal noise by calculating the level of a signal generated from the receiver 120 when the shutter 162 is closed. The level of the signal can be determined, for example, by root mean square (RMS) of this signal.

Figure 12:
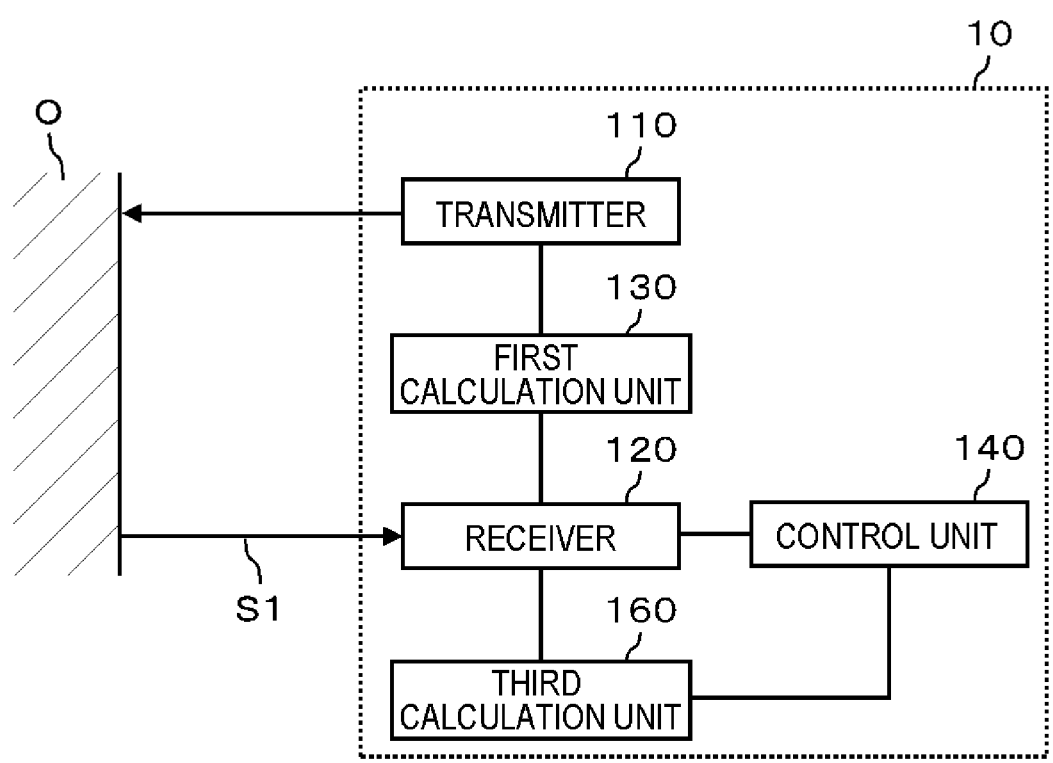
FIG. 12 is a diagram illustrating a modification example of FIG. 11.

FIG. 12 is a diagram illustrating a modification example of FIG. 11. The control unit 140 may determine the level of the internal noise in a manner as follows.

The control unit 140 controls the receiver 120 such that the signal is not generated from the receiver 120 even if the receiver 120 receives the signal S1. In one example, when the receiver 120 includes an avalanche diode (AD), the control unit 140 can reduce a reverse bias voltage applied to the AD such that the signal is not generated from the receiver 120 even if the receiver 120 receives the signal S1. The third calculation unit 160 can calculate the level of the signal generated from the receiver 120 by the internal noise by calculating the level of the signal generated from the receiver 120 at a timing at which the control unit 140 controls the receiver 120 as described above.

Example 3

Figure 13:
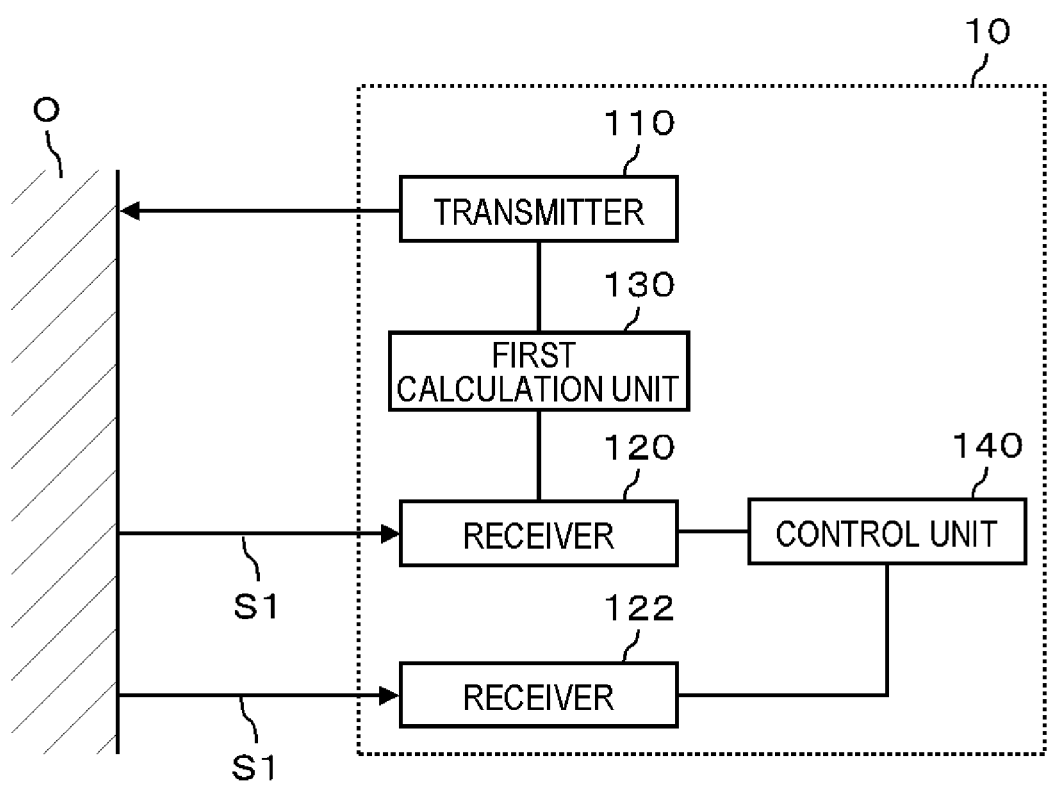
FIG. 13 is a diagram illustrating a detection device according to Example 3.

FIG. 13 is a diagram illustrating a detection device 10 according to Example 3 and corresponds to FIG. 1 in the embodiment. The detection device 10 according to the example is similar to the detection device 10 according to the embodiment except for the following points.

The detection device 10 includes a receiver 122. The receiver 122 is provided at a position capable of receiving the signal S1, similar to the receiver 120. The receiver 122 includes a plurality of receiving elements 120a, similar to the receiver 120 illustrated in FIG. 5. That is, in Example 3, the receiver 122 to recognize the shape of the IFOI of the signal S1 is provided separately from the receiver 120. Thus, the control unit 140 can determine the shape of the IFOI of the signal S1 based on the receipt result of the receiver 122 (that is, the receipt result of each of the plurality of receiving elements 120a). Accordingly, the control unit 140 can control the size of the IFOV based on the receipt result of the receiver (receiver 122) different from the receiver (receiver 120) as a control target.

Example 4

Figure 14:
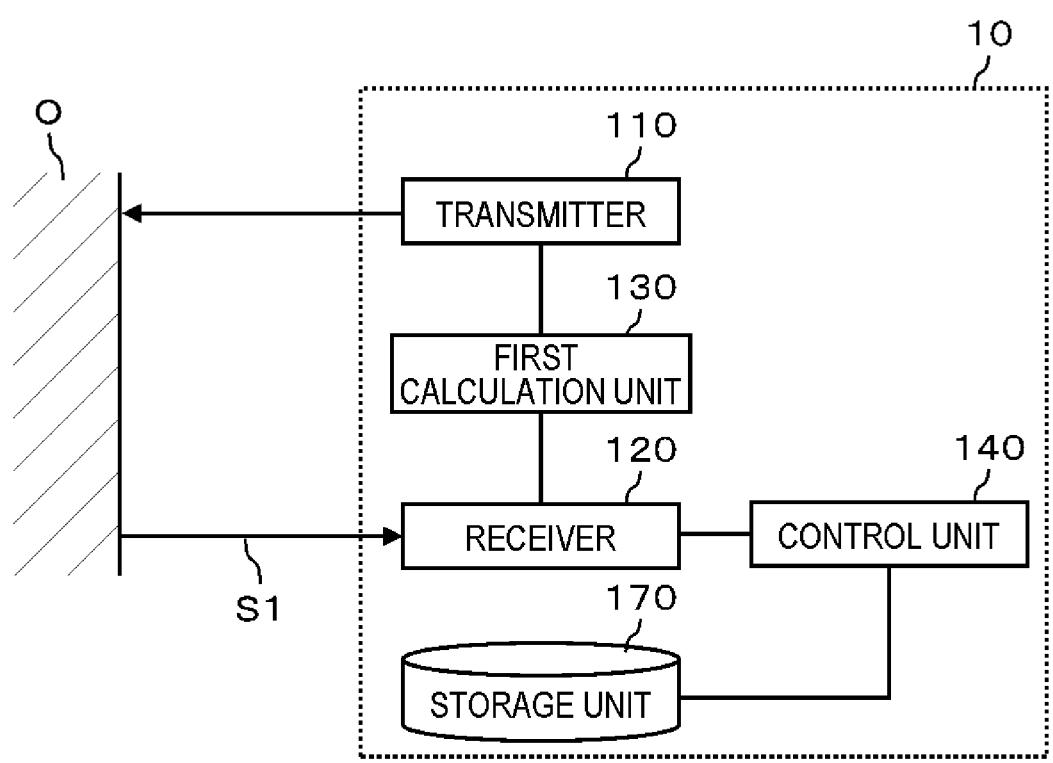
FIG. 14 is a diagram illustrating a detection device according to Example 4.

FIG. 14 is a diagram illustrating a detection device 10 according to Example 4 and corresponds to FIG. 1 in the embodiment. The detection device 10 according to the example is similar to the detection device 10 according to the embodiment except for the following points.

The detection device 10 includes a storage unit 170. The storage unit 170 stores a predetermined relationship between the level of noise and the size of the IFOV of the receiver 120 at the level of the noise. In the relationship, the size of the IFOV can be the optimum size corresponding to the level of the noise. In one example, the optimum size of the IFOV can be determined by operating the detection device 10 in advance.

The control unit 140 controls the size of the IFOV of the receiver 120 in accordance with the detection result of the level of the noise (for example, external noise and internal noise) in the receiver 120 and the above-described relationship stored in the storage unit 170. In this manner, the control unit 140 can control the size of the IFOV of the receiver 120 and determine the optimum size of the IFOV in response to the level of the noise of the receiver 120.

In the example illustrated in FIG. 14, the storage unit 170 is mounted in the detection device 10. In one example, the storage unit 170 may be a microcomputer (for example, integrated circuit (IC)).

Figures 15, 16:
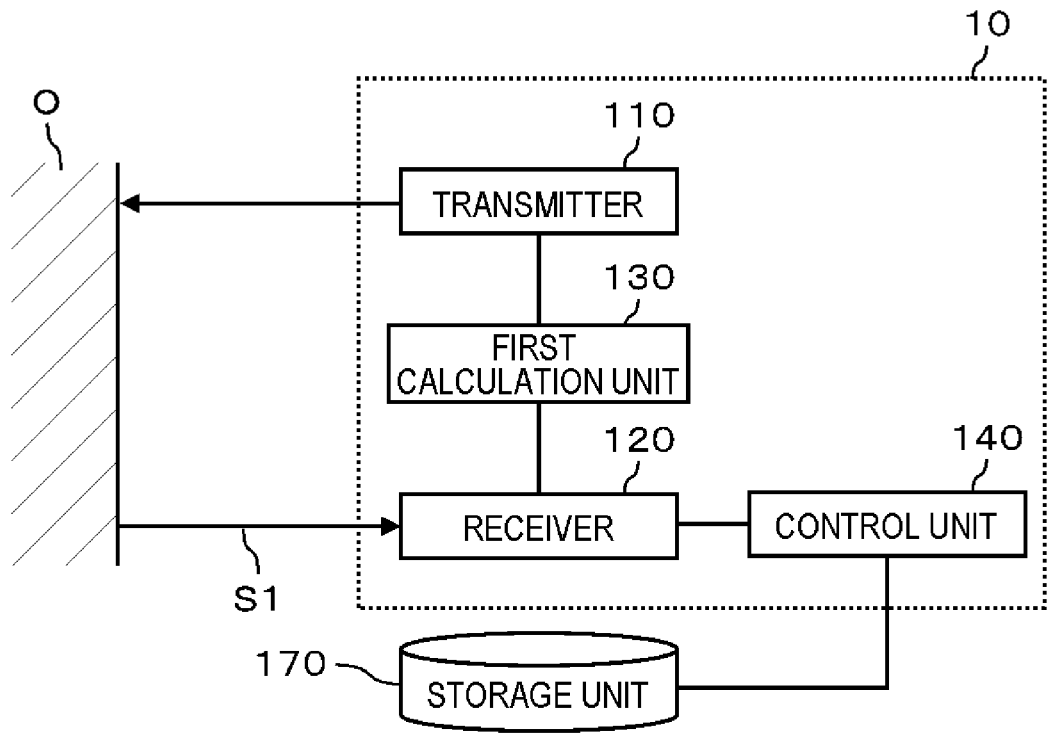
FIG. 15 is a diagram illustrating a modification example of FIG. 14.
FIG. 16 is a diagram illustrating a first example of a table stored in a storage unit illustrated in FIG. 14 or 15.

FIG. 15 is a diagram illustrating a modification example of FIG. 14. As illustrated in FIG. 15, the storage unit 170 may be outside the detection device 10. In one example, the storage unit 170 can be on a network outside the detection device 10.

FIG. 16 is a diagram illustrating a first example of a table stored in the storage unit 170 illustrated in FIG. 14 or 15.

The storage unit 170 stores the predetermined relationship between the level of noise (external noise A1, A2, . . . and internal noise B1, B2, . . . ) and the sizes X1, X2, . . . of the IFOV of the receiver 120 (for example, FIG. 14 or 15) at the level of the noise. The control unit 140 can extract the external noise and the internal noise that most closely match with the detection result of the level of the noise (the level of the external noise and the level of the internal noise) of the receiver 120 from the table, and can determine the size of the IFOV corresponding to the extracted external noise and internal noise as the optimum size of the IFOV.

FIG. 17 is a diagram illustrating a second example of the table stored in the storage unit 170 illustrated in FIG. 14 or 15.

The storage unit 170 stores the predetermined relationship between the level of noise (external noise A1, A2, . . . and internal noise B1, B2, . . . ) and the focal lengths D1, D2, . . . of the optical system 200 (FIGS. 6 and 7) at the level of the noise. As described with reference to FIGS. 6 and 7, the focal length of the optical system 200 corresponds to the size of the IFOV of the receiver 120. The control unit 140 can extract the external noise and the internal noise that most closely match with the detection result of the level of the noise (the level of the external noise and the level of the internal noise) of the receiver 120 from the table, and can determine the focal length corresponding to the extracted external noise and internal noise as the optimum focal length (that is, the optimum size of the IFOV).

FIG. 18 is a diagram illustrating a third example of the table stored in the storage unit 170 illustrated in FIG. 14 or 15.

The storage unit 170 stores the predetermined relationship between the level of noise (noise ratios (ratio of external noise to internal noise) C1, C2, . . . ) and the sizes X1, X2, . . . of the IFOV of the receiver 120 (for example, FIG. 14 or 15) at the level of the noise. The control unit 140 can extract the noise ratio (the ratio of the external noise to the internal noise) that most closely matches with the detection result of the level of the noise (the ratio of the external noise to the internal noise) of the receiver 120 from the table, and can determine the size of the IFOV corresponding to the extracted noise ratio as the optimum size of the IFOV.

FIG. 19 is a diagram illustrating a fourth example of the table stored in the storage unit 170 illustrated in FIG. 14 or 15.

The storage unit 170 stores the predetermined relationship between the level of noise (noise ratios (ratio of external noise to internal noise) C1, C2, . . . ) and the focal lengths D1, D2, . . . of the optical system 200 (FIGS. 6 and 7) at the level of the noise. As described with reference to FIGS. 6 and 7, the focal length of the optical system 200 corresponds to the size of the IFOV of the receiver 120. The control unit 140 can extract the noise ratio (the ratio of the external noise to the internal noise) that most closely matches with the detection result of the level of the noise (the ratio of the external noise to the internal noise) of the receiver 120 from the table, and can determine the focal length corresponding to the extracted noise ratio as the optimum focal length (that is, the optimum size of the IFOV).

Example 5

Figure 20:
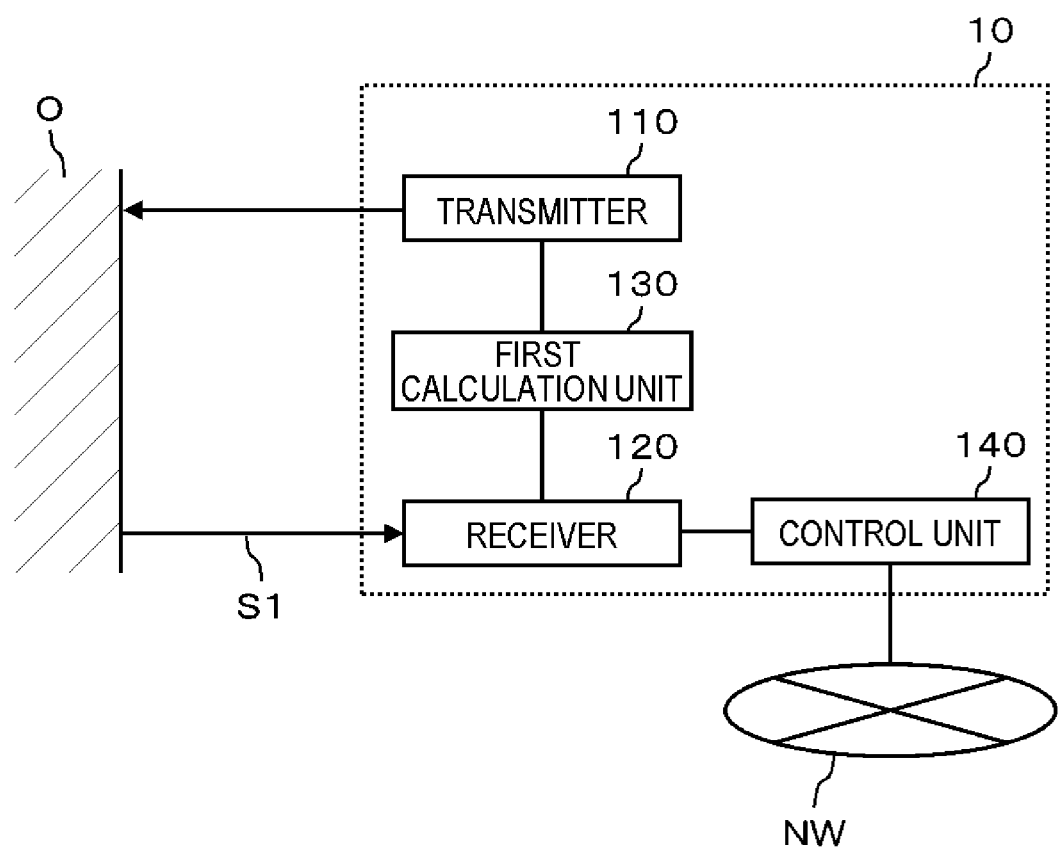
FIG. 20 is a diagram illustrating a detection device according to Example 5.

FIG. 20 is a diagram illustrating a detection device 10 according to Example 5 and corresponds to FIG. 1 in the embodiment. The detection device 10 according to the example is similar to the detection device 10 according to the embodiment except for the following points.

The control unit 140 can receive information indicating an environment in which the receiver 120 is disposed from a network NW, and determine the level of the external noise (the noise entering into the IFOV of the receiver 120 from the outside of the receiver 120) based on this information.

In one example, the information indicating the environment in which the receiver 120 is disposed is the current weather condition. The level of the external noise may depend on the weather condition. For example, when the weather is fine, the level of the external noise can be high. When the weather is cloudy or rainy, the level of the external noise can be low. In the example, the receiver 120 can determine the level of the external noise based on the current weather condition.

In another example, the information indicating the environment in which the receiver 120 is disposed means the current time point. The level of the external noise may depend on the presence or absence of the sun. For example, when the time point is in daytime (that is, when the sun is present), the level of the external noise can be high. When the time point is in the night (that is, when the sun is absent), the level of the external noise can be low. In this example, the receiver 120 can determine the level of the external noise based on the current time point.

Figure 21A:
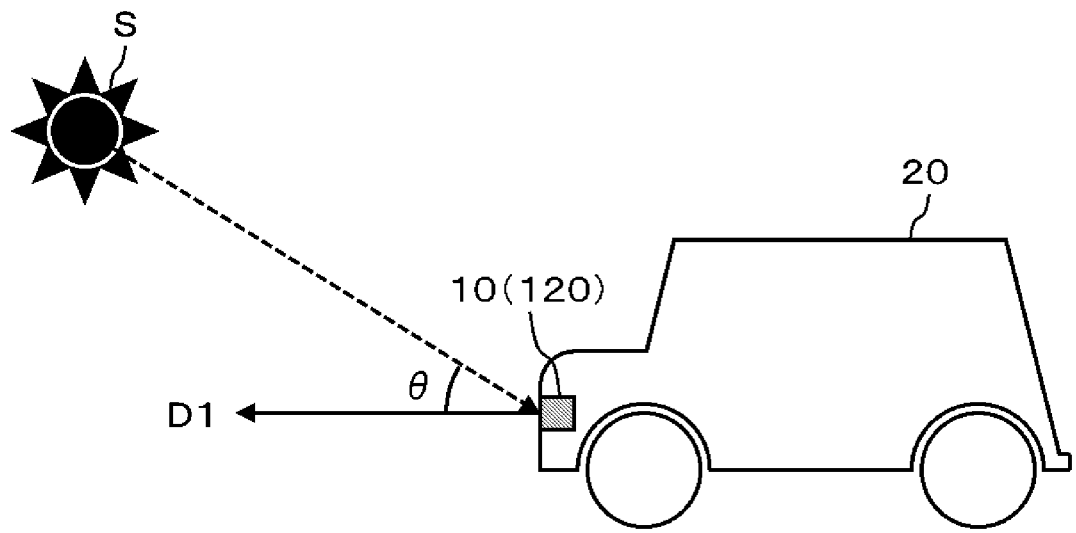
FIGS. 21A-21B is a diagram are diagrams for explaining one example of details of the detection device illustrated in FIG. 20.
Figure 21B:
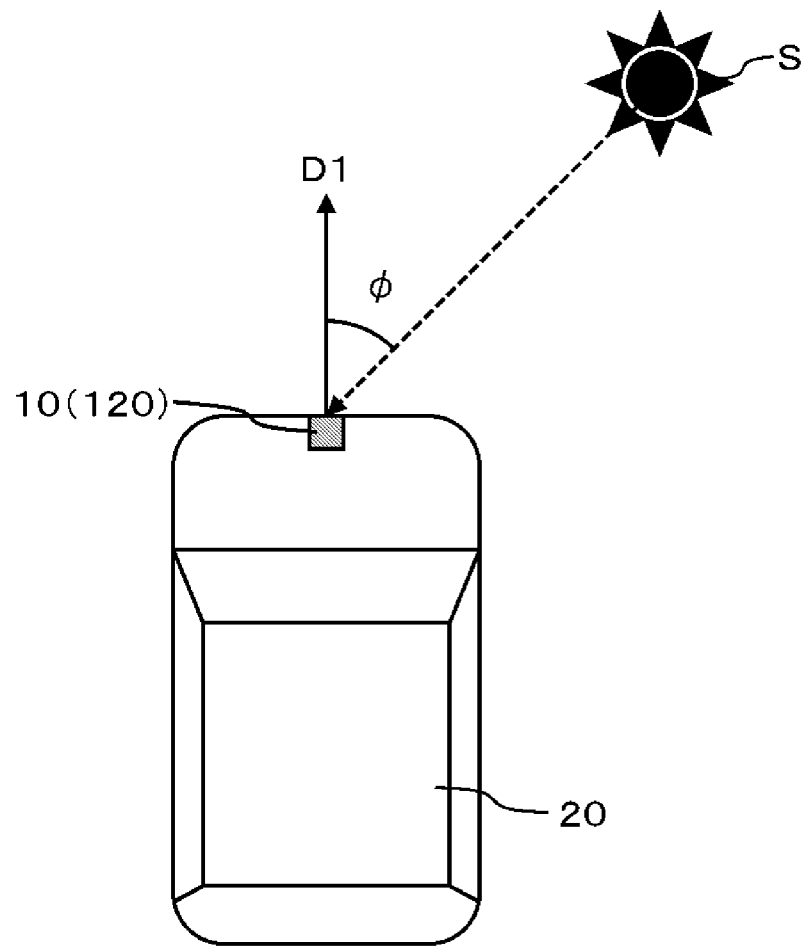

FIG. 21 is a diagram for explaining one example of details of the detection device 10 illustrated in FIG. 20. In the example illustrated in FIG. 21, the detection device 10 is mounted in a moving object 20. In particular, in the example illustrated in FIG. 21, the moving object 20 is an automobile. In another example, the moving object 20 may be a motorcycle, a train, an airplane, or a ship, for example.

The control unit 140 may receive information indicating the current position of the sun S relative to the receiver 120 from the network NW, and may determine the level of the external noise based on this information. In particular, in the example illustrated in FIG. 21A, the sun S is located at an elevation angle θ from a front direction D1 of the receiver 120. In the example illustrated in FIG. 21B, the sun S is located at an azimuth angle φ from the front direction D1 of the receiver 120. The smaller the elevation angle θ is, the greater the level of the external noise is. The smaller the azimuth angle φ is, the greater the level of the external noise is.

In one example, the control unit 140 can receive information indicating the current position of the moving object 20 (receiver 120) and information indicating the current position of the sun S from the network NW, and can determine the current position of the sun S relative to the receiver 120 based on these information.

FIG. 22 is a diagram illustrating a first example of a table stored in the network NW illustrated in FIG. 20.

The network NW stores a predetermined relationship between the current positions P1, P2, . . . of the receiver 120 on map information and the sizes X1, X2, . . . of the IFOV of the receiver 120 at the current positions. The optimum size of the IFOV may be determined by the current position of the receiver 120 (moving object 20) on the map information. In this case, the network NW can store the optimum size of the IFOV corresponding to the current position of the receiver 120.

The control unit 140 controls the size of the IFOV of the receiver 120 in accordance with the detection result of the current position of the receiver 120 and the above-described relationship stored in the network NW. Specifically, the control unit 140 can extract the current position that most closely matches with the detection result of the current position of the receiver 120 from the table, and can determine the size of the IFOV corresponding to the extracted current position as the optimum size of the IFOV.

FIG. 23 is a diagram illustrating a second example of the table stored in the network NW illustrated in FIG. 20.

The network NW stores a predetermined relationship between the current positions P1, P2, . . . of the receiver 120 on map information and the focal lengths D1, D2, . . . of the optical system 200 (FIGS. 6 and 7) at the current positions. As described with reference to FIGS. 6 and 7, the focal length of the optical system 200 corresponds to the size of the IFOV of the receiver 120. The network NW can store the optimum focal length, that is, the optimum size of the IFOV corresponding to the current position of the receiver 120.

The control unit 140 controls the focal length of the optical system 200 (FIGS. 6 and 7) (that is, the size of the IFOV of the receiver 120) in accordance with the detection result of the current position of the receiver 120 and the above-described relationship stored in the network NW. Specifically, the control unit 140 can extract the current position that most closely matches with the detection result of the current position of the receiver 120 from the table, and can determine the focal length corresponding to the extracted current position as the optimum focal length (that is, the optimum size of the IFOV).

Example 6

The transmitter 110 in the above-described examples may be configured to scan an object or a predetermined measurement region. For example, the transmitter 110 may include a movable reflection unit that reflects an electromagnetic wave emitted from a generation source (for example, laser diode) of the electromagnetic wave and is capable of scanning an object O (or predetermined measurement region) with the electromagnetic wave. The movable reflector may be configured by a micro electro mechanical system (MEMS) mirror, for example. In this case, the movable reflector reflects the electromagnetic wave applied from the generation source of the electromagnetic wave while changing an angle. Thus, the transmitter 110 can emit light in various directions, and thus the above-described scanning is possible.

In a case of such a configuration, the control unit 140 may control the size of the IFOV of the receiver 120 (focal length of the optical system 200) based on an angle at which the movable reflector reflects the electromagnetic wave emitted from the generation source (that is, the direction in which the transmitter 110 emits the electromagnetic wave).

That is, in the transmitter 110 capable of performing scanning as described above, an optical system is generally designed such that the IFOI of the electromagnetic wave emitted to the center of a scannable region (measurement region) has the optimum shape (ideal shape). In this case, due the influence such as aberration, the shape of the IFOI of the emitted electromagnetic wave has an increasing deformation amount from the optimum shape with increasing the distance from the center. In other words, the further the distance from the center is, the more greatly the shape of the IFOI changes.

Thus, the control unit 140 can perform receipt depending on the change of the shape of the IFOI similar to the above-described examples by controlling the size of the IFOV of the receiver 120 (focal length of the optical system 200) based on the angle at which the movable reflection unit reflects the electromagnetic wave emitted from the generation source (that is, the direction in which the transmitter 110 emits the electromagnetic wave).

As mentioned above, although the embodiment and the examples have been described with reference to the drawings, the embodiment and the examples are just examples of the present invention, and various configuration other than the above configurations may be employed.

This application claims priority based on Japanese Patent Application No. 2017-012785 filed on Jan. 27, 2017, the entire disclosure of which is incorporated herein.

The invention claimed is:

1. A detection device comprising:
    a transmitter capable of transmitting an electromagnetic wave;
    a receiver capable of receiving the electromagnetic wave transmitted from the transmitter and reflected by an object; and
    a controller controlling a size of an instantaneous field of view of the receiver based on an acquired result of a current position of the receiver acquired by communication,
    wherein the receiver receives the electromagnetic wave from outside of the detection device, and
    where the controller is configured to:
        determine the size of the instantaneous field of view associated with the acquired result of the current position of the receiver in a predetermined relationship between the current position of the receiver on map information and the size of the instantaneous field of view of the receiver; and
        change the size of an instantaneous field of view of the receiver to the determined size of the instantaneous field of view.

2. The detection device according to claim 1, wherein the receiver comprises:
    an optical system converging the electromagnetic wave transmitted from the transmitter and reflected by the object at a position spaced by a focal length; and
    a receiving element receiving the electromagnetic wave converged by the optical system, and
    wherein the controller controls the focal length of the optical system.

3. The detection device according to claim 1, wherein the controller receives environment information corresponding to the current position of the receiver, and controls the instantaneous field of view of the receiver based on the environment information.

4. The detection device according to claim 1, wherein the acquired result of the current position is information indicating the current position of the receiver on map information.

5. The detection device according to claim 1, wherein the controller receives information indicating the current position of the receiver from a network as the acquired result.

6. The detection device according to claim 1, wherein the predetermined relationship is in a table stored in a network, and
    wherein the controller is further configured to:
        extract a position that most closely matches with the acquired result of the current position of the receiver from the table; and
        determine, as the size of the instantaneous field of view, the size of the instantaneous field of view associated with the extracted position in the predetermined relationship.

7. A method of detecting a distance to an object using a transmitter and a receiver, the method comprising:
- controlling a size of an instantaneous field of view of the receiver based on an acquired result of a current position of the receiver acquired by communication, wherein the receiver receives an electromagnetic wave from outside of a detection device;
- receiving, by the receiver the electromagnetic wave transmitted from the transmitter and reflected from the object;
- determining the size of the instantaneous field of view associated with the acquired result of the current position of the receiver in a predetermined relationship between the current position of the receiver on map information and the size of the instantaneous field of view of the receiver; and
- changing the size of an instantaneous field of view of the receiver to the determined size of the instantaneous field of view.

8. A non-transitory computer-readable storage medium storing a program causing a computer to execute the method according to claim 7.

9. The method according to claim 7, wherein the predetermined relationship is in a table stored in a network, and wherein the method further comprises:
- extracting a position that most closely matches with the acquired result of the current position of the receiver from the table; and
- determining, as the size of the instantaneous field of view, the size of the instantaneous field of view associated with the extracted position in the predetermined relationship.

* * * * *